United States Patent [19]

Arnoldussen

[11] 4,306,773
[45] Dec. 22, 1981

[54] ELECTROCHROMIC DISPLAY DEVICE HAVING REDUCED FILM DISSOLUTION

[75] Inventor: Thomas C. Arnoldussen, Birmingham, Mich.

[73] Assignee: General Motors Corporation, Detroit, Mich.

[21] Appl. No.: 962,061

[22] Filed: Nov. 20, 1978

[51] Int. Cl.³ .............................................. G02F 1/17
[52] U.S. Cl. ..................................... 350/357; 29/570; 204/164
[58] Field of Search ......................... 350/357; 29/570; 204/164; 427/108, 109, 162, 166, 331

[56] References Cited

U.S. PATENT DOCUMENTS

| | | | |
|---|---|---|---|
| 3,827,784 | 8/1974 | Giglia et al. | 350/357 |
| 3,839,857 | 10/1974 | Berets et al. | 350/357 |
| 3,840,288 | 10/1974 | Schnatterly | 350/357 |
| 3,944,333 | 3/1976 | Leibowitz | 350/357 |
| 3,957,352 | 5/1976 | Leibowitz | 350/357 |
| 4,012,831 | 3/1977 | Leibowitz | 29/570 |
| 4,021,100 | 5/1977 | Giglia | 350/357 |
| 4,076,386 | 2/1978 | Giglia | 350/357 |
| 4,170,406 | 10/1979 | Giglia et al. | 350/357 |
| 4,182,551 | 1/1980 | Washida et al. | 350/357 |
| 4,233,339 | 11/1980 | Leibowitz | 350/357 X |

OTHER PUBLICATIONS

R. S. Crandall et al., "Measurement of the Diffusion Coefficient of Electrons in WO₃ Films", APL, vol. 26, No. 3, Feb. 1, 1975, pp. 120–121.

Primary Examiner—James W. Davie
Attorney, Agent, or Firm—Douglas D. Fekete

[57] ABSTRACT

In the preferred embodiment, a novel tungsten oxide film is presented for incorporation into an electrochromic display device wherein a surface of the film is in contact with an acidic aqueous electrolyte. The film comprises an underlying layer consisting of true amorphous, electrochromic tungsten oxide and an integral surface layer consisting of nonelectrochromic, random network amorphous tungsten oxide that is substantially less soluble in the electrolyte than the underlying electrochromic tungsten oxide. Preferably, the surface layer is formed by treating a vapor-deposited tungsten oxide film by exposure to a low energy plasma to restructure the molecular bonding at the surface without affecting the underlying tungsten oxide. When the treated film is incorporated into a display device, the surface layer minimizes dissolution of the film into the electrolyte to substantially extend the useful lifetime of the device, but readily conducts protons between the underlying layer and the electrolyte so as not to significantly interfere with device cycling.

7 Claims, 1 Drawing Figure

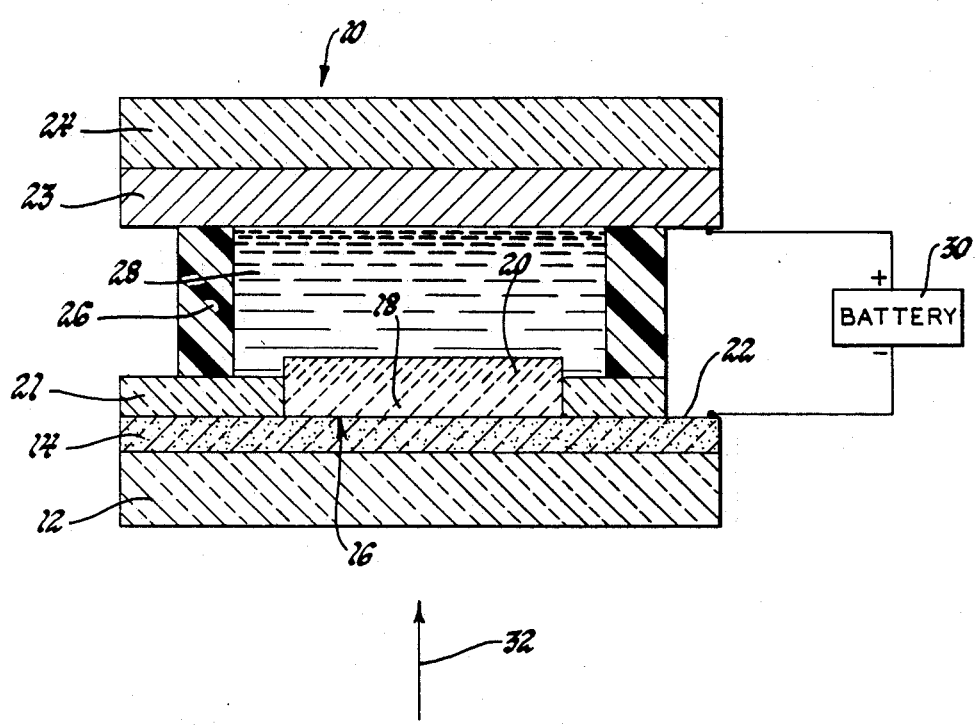

ELECTROCHROMIC DISPLAY DEVICE HAVING REDUCED FILM DISSOLUTION

BACKGROUND OF THE DISCLOSURE

This invention relates to an electrochromic display device having a selectively colorable tungsten oxide film in contact with an acidic aqueous electrolyte. More particularly, this invention relates to improving the useful lifetime of an electrochromic device by minimizing the dissolution of the tungsten oxide film into the acidic aqueous electrolyte.

In a conventional electrochromic display device, the desired display is formed by applying an electric field to selectively color an electrochromic tungsten oxide film of empirical formula $WO_3$. Typically, the display comprises a supporting glass plate having a transparent tin oxide electrode on one surface thereof and a transparent $WO_3$ thin film vapor-deposited onto the tin oxide electrode. The deposited $WO_3$ film is contacted with an acidic aqueous electrolyte, for example a 10% by volume $H_2SO_4$ solution, which is in turn in contact with a suitable counterelectrode.

The deposited $WO_3$ film is colorless. The display is developed by connecting the tin oxide electrode to a negative battery terminal and the counterelectrode to the positive terminal. The applied electrical field and protons from the electrolyte cause the film to change colors in accordance with the following half-reaction:

$$xH^+ + xe^- + WO_3(\text{colorless}) \longleftrightarrow H_xWO_3(\text{Blue})$$

wherein the extent of reaction x is controlled by the current entering the film and is proportional to the depth of coloration. The blue color, designated tungsten bronze, persists after the electric field is discontinued. However, by reversing the polarity of the electrodes, the reaction is reversed, the electrochromic film is bleached, and the display is erased.

A major problem encountered with conventional electrochromic display devices is that the tungsten oxide film dissolves in the aqueous electrolyte when the device is simply sitting on the shelf. The rate of film dissolution is substantially increased by the cyclic operation of the device, that is, by the alternately coloring and bleaching of the film. Thus, the device has a short shelf lifetime and an even shorter cycle lifetime.

Since film dissolution depends upon the presence of water in the electrolyte, attempts to reduce film dissolution have included substituting, for the aqueous electrolyte, an electrolyte consisting of a suitable acid dissolved in an organic solvent, such as glycerine. The use of an organic-base electrolyte improves the device lifetime, but requires a substantially longer switching time, the time required to color or bleach the film. Thus, attempts to minimize water in the electrolyte have failed to produce a suitable electrochromic device.

Another approach for reducing film dissolution has been to saturate an aqueous electrolyte with dissolved tungsten oxide salts. In practice, the use of a saturated electrolyte has failed to significantly extend the device lifetime. It has also been proposed to place adjacent the electrochromic film a porous membrane permeated with electrolyte. For example, a sponge-like polymer matrix carrying electrolyte minimizes contact between the electrolyte and the film and thereby reduces dissolution. The use of a porous layer has not been successful in eliminating film dissolution and has the obvious disadvantage of requiring additional materials to construct the device.

Therefore, it is an object of this invention to improve the shelf and cycle lifetimes of an electrochromic display device having an electrochromic tungsten oxide film in contact with an acidic aqueous electrolyte by substantially reducing the dissolution of the film into said electrolyte, but without impairing the desired display-forming operation of the device.

It is a further object of this invention to provide, in an electrochromic display device, an electrochromic tungsten oxide film having a treated surface, which surface prevents the dissolution of the film into the electrolyte, but readily conducts protons to effect the desired coloring and bleaching reactions within the underlying film. The treated film surface of this invention is not itself electrochromic, but acts as a physical barrier to the dissolution of the underlying electrochromic film material.

It is a still further object of this invention to provide a method for treating a vapor-deposited electrochromic tungsten oxide film to produce a surface that is insoluble in an acidic aqueous solution, but which treatment does not adversely affect the ability of the film surface to readily conduct protons. When the treated film of this invention is incorporated into an electrochromic display device, the treated surface prevents the film from dissolving into the acidic aqueous electrolyte and readily conducts protons into and out of the film to effect the desired coloring and bleaching reactions. Thus, an electrochromic device having a tungsten oxide film treated in accordance with this invention evidences both a substantially extended useful lifetime and a fast switching time.

SUMMARY OF THE INVENTION

In a preferred embodiment, these and other objects are accomplished by providing, in an electrochromic display device, a vapor-deposited amorphous tungsten oxide film whose electrolyte-contacting surface is treated to render it resistant to the acidic aqueous electrolyte. The electrochromic tungsten oxide film is preferably surface treated after it is vapor-deposited onto a transparent doped tin oxide electrode that in turn has been applied onto a glass substrate. The surface treatment comprises exposing the film to a low energy RF plasma discharge struck in a low pressure oxygen atmosphere. The treatment is effected without raising the overall film temperature to the tungsten oxide crystallization temperature of 345° C. and preferably without raising the temperature more than about 50° C. The excited charged particles in the plasma bombard the surface, significantly altering the surface properties, but not affecting the properties of the underlying material. For a typical vapor-deposited film having a thickness of between 0.5 to 1.0 micron, only a surface layer about 0.05 to 0.15 microns thick is affected by the plasma treatment, although the boundary is not precisely defined. Some significant properties of the surface and underlying layers compare as follows:

(1) Solubility: The underlying layer of as-deposited tungsten oxide readily dissolves into a highly acidic aqueous solution, such as a typical 10% by volume $H_2SO_4$ electrolyte solution. In contrast, the treated surface layer is acid resistant and dissolves into a highly acidic solution at a substantially slower rate, if at all, there being no visible dissolution after several weeks of exposure to a highly acidic solution. The treated material does dissolve appreciably in neutral water, although at a substantially slower rate than the as-deposited material. Furthermore, when a film having a treated surface is placed in contact with a highly acidic solution, the treated surface prevents the underlying layer from dissolving into the acidic solution.

(2) Electrochromatism: The plasma-treated material is not electrochromic, that is, it does not readily change colors in the presence of acid and an electric field. In contrast, the electrochromic properties of the as-deposited tungsten oxide are well-known.

(3) Proton conduction: It is believed that the ability of the vapor-deposited tungsten oxide and the plasma-treated tungsten oxide to conduct protons are comparable. Proton conduction by the surface layer is important since protons must be transferred to and from the underlying layer to effect the desired electrochromic reactions.

(4) Electron conduction: It is believed that the plasma-treated tungsten oxide is substantially less electron conductive than the vapor-deposited material.

(5) Appearance: The plasma-treated film is transparent and colorless, and is visually the same as an untreated vapor-deposited film (not in the tungsten bronze state). The vapor-deposited tungsten oxide is amorphous and the treated surface is also preferably amorphous, although a semi-amorphous or borderline crystalline layer is suitable. Although both the treated surface layer and the underlying layer are preferably amorphous and appear similar when viewed microscopically, for the reasons set forth hereinafter, it is believed that the as-deposited material is a true amorphous layer and that the plasma-treated material is a random network amorphous layer.

When incorporated into an electrochromic display device, the acid-resistant treated surface of the tungsten oxide film is in contact with a highly acidic aqueous electrolyte and protects the underlying material from direct contact with the electrolyte. When the device is actuated by applying an electric field between the tin oxide electrode and a counterelectrode in contact with the electrolyte, the tin oxide being driven negatively, the desired electrochromic reactions occur in the underlying layer, turning it tungsten bronze and forming the desired display. The nonelectrochromic surface layer does not change color, but conducts protons to the underlying material to facilitate the desired reactions therein. The good proton conduction of the surface has no significant effect upon the time required to color the underlying layer; i.e., the switching time. When the polarity of the applied electric field is reversed, the underlying layer is bleached without any noticeable delay due to the presence of the treated surface. Most significantly, the surface layer does not itself dissolve into the electrolyte and prevents the underlying electrochromic layer from dissolving. Thus, the useful lifetime of the device is substantially extended.

While not desiring to be limited to any particular theory, it is believed that the vapor-deposited tungsten oxide film consists primarily of trimeric $W_3O_9$ molecules and the hydrated products thereof. The trimers are formed during the vapor deposition process wherein tungsten oxide of empirical formula $WO_3$ is sublimed at temperatures as great as 980° C. and the resulting vapor is condensed onto the desired surface. Under these conditions, it is believed that $WO_3$ monomers react to form cyclic $WO_3O_9$ trimers in the vapor comprising a ring of alternating W and O atoms, each W being also bonded by double bonds to two additional O atoms. The condensing vapors form an amorphous film of individual trimeric molecules bonded together by weak intermolecular forces. It follows that it is unlikely that the film dissolves in water directly as tunstate anions $WO_4^{-2}$, since such a dissolution mechanism would require breaking intramolecular bonds. Rather, dissolution probably involves the formation of polyanions, for example, a hydrated trimeric anion or a combination of hydrated trimers forming an anion such as pseudometatungstate $HW_6O_{20}^{-3}$, which dissolve and thereafter decompose to form tungstate anions.

When the amorphous vapor-deposited film is treated by exposure to a plasma discharge, the charge plasma particles bombard the surface at randomly-located sites. At the impact sites, the bombarding particles transfer energy to the tungsten oxide to break some intratrimer bonds and permit molecular bonds to re-form between neighboring trimers. Thus, the plasma treatment does not alter the empirical composition of the surface, but only restructures the tungsten oxide to comprise a random network of molecular bonds, in marked contrast to the pretreatment aggregation of trimers. The restructed tungsten oxide is substantially less soluble in an aqueous solution primarily because formation of the aforementioned polyanions would require breaking molecular bonds. Furthermore, when treated with a low energy plasma, the bombarding plasma particles do not penetrate to the underlying portion and, therefore, do not affect the desired electrochromic properties of the underlying material. Also, the plasma power is preferably not sufficient to cause the film or its surface to crystallize. Thus, the preferred treated surface is amorphous and retains good proton-conduction properties.

Thus, the preferred plasma treatment of the subject tungsten oxide film in accordance with this invention renders the surface acid-resistant by restructuring molecular bonds therein to form a random network amorphous layer. When the treated film is incorporated into an electrochromic display device, the underlying material is electrochromic and is selectively colorable to form the desired display. The surface layer is not electrochromic, but is difficultly soluble in the electrolyte and prevents the soluble underlying layer from dissolving. Furthermore, the presence of the treated surface has no adverse effect upon device cycling. Thus, this invention provides an electrochromic display device having good operating characteristics and a substantially extended useful lifetime.

DESCRIPTION OF THE DRAWINGS

The only FIGURE is a cross-sectional view of an electrochromic display device comprising a vapor-deposited tungsten oxide film having an acid-resistant surface layer formed in accordance with this invention.

DESCRIPTION OF THE INVENTION

Referring to the FIGURE, there is illustrated a preferred electrochromic display device 10 having the extended useful lifetime provided by this invention. Electrochromic device 10 is generally rectangular and comprises, on a first supporting glass plate 12, a transparent display electrode 14, preferably an electrically conductive Sb-doped $SnO_2$ thin film. As hereinafter described, a tungsten oxide film 16 is vapor-deposited upon a predetermined portion of electrode 14. In accordance with this invention, tunsten oxide film 16 comprises an underlying electrochromic layer 18 in contact with electrodes 14 and acid-resistant layer 20. The boundary between layers 18 and 20 is not precisely defined, as indicated by the FIGURE. The remaining portion of electrode 14, not covered by tungsten oxide film 16, is covered with an electrically insulating film 21 of transparent silicon dioxide, except that a small peripheral area 22 of electrode 14 is exposed to provide suitable electrical contact with electrode 14. For simplicity of illustration, electrode 14 is illustrated as covering the entire surface of glass support 12 and only a single tungsten oxide film 16 is shown. However, it is well-known to employ in device 10 a plurality of discrete electrode 14 segments and discrete tungsten oxide film 16 segments and to shape and arrange the segments to form a desired display pattern. For example, seven generally rectangular tungsten oxide film segments are conventionally arranged in a figure-eight design, each segment lying upon a separate electrode segment and being selectively colorable to display a desired numeric digit. In devices employing a plurality of film 16 segments, each segment preferably has an electrochromic layer 18 and an acid-resistant layer 20.

A metallic lead counterelectrode 23 on a second supporting glass plate 24 lies in a generally parallel, spaced relationship to support 12 and electrode 14. Acid-resistant walls 26 extending between counterelectrode 23 and insulating layer 21 define a liquid-tight chamber about tungsten oxide film 6, said chamber containing an electrolyte paste 28. Electrolyte paste 28 preferably consists of equal portions by weight of $TiO_2$ and a 10% by volume solution of $H_2SO_4$ in water. The $TiO_2$ provides a white background to enable the display to be more easily viewed. Electrolyte 28 thus contacts the entire immediate surface of film 16, but is prevented from contacting electrode 14 by insulating film 21.

Device 10 is operated to form the desired display by connecting, through suitable leads, electrode 14 at exposed area 22 to the negative terminal of a battery 30 and counterelectrode 23 to the positive terminal. Electrons from electrode 14 and protons supplied from electrolyte 28 through acid-resistant surface film 20 enter electrochromic layer 18 and cause the desired electrochromic reactions to occur therein. The reaction creates a tungsten bronze display which is viewed in the direction of arrow 32 against the contrasting white background provided by the $TiO_2$ mixed with the electrolyte. Reversing the polarity of the electric field by connecting electrode 14 to the positive battery terminal and counterelectrode 23 to the negative battery terminal reverses the reaction within layer 18 and thereby bleaches the display.

In the preferred embodiment, a 0.5 micron thick Sb-doped tin oxide film 14 is initially applied to one surface of glass plate 12 and etched to form a predetermined electrode pattern. A silicon dioxide film 21 is deposited upon electrode 14 and any adjacent exposed glass surface. Thereafter, a conventional epoxy-type photoresist mask is applied to selected portions of the silicon dioxide film being exposed where the display is desired. The exposed silicon dioxide film is then etched to expose electrode 14. Thus, the desired electrochromic display pattern is defined by two successive, identically patterned masks, a silicon dioxide mask and a photoresist mask, that expose electrode 14 where deposition of the electrochromic film is desired.

The tungsten oxide film is formed by positioning plate 12 having the aforementioned overlayers within a vacuum chamber directly above an open vessel containing a body of crystalline tungsten oxide powder of empirical formula $WO_3$, with the masked plate-surface facing the powder. The open vessel is composed of electrically resistant material. Electrical current conducted through the vessel thus heats the tungsten oxide to a temperature at which it sublimes, about 980° C. at a pressure of $10^{-4}$ torr. Vapors formed by the subliming tungsten oxide condense upon the coated glass surface. It has been found that heating the glass plate to about 180° C. causes the condensing vapor to form a denser film having better adhesion to the electrode. Vapor condensation is continued for a sufficient time to deposit an amorphous tungsten oxide film approximately 1.0 micron thick.

Vapor deposition of the tungsten oxide film occurs over both the exposed electrode 14 and the photoresist mask. The photoresist mask is removed by conventionally dissolving it in an organic solvent. As the mask dissolves, it removes the tungsten oxide film deposited upon it and re-exposes the silicon dioxide surface. Thus, only the tungsten oxide film deposited directly upon electrode 14 in the desired pattern remains after photoresist removal.

In accordance with this invention, the tungsten oxide film surface is treated by exposing it to a low-energy RF plasma discharge. In a suitable hermetic chamber, the tungsten oxide coated plate is positioned between two electrodes spaced apart by about 8.7 cm. Oxygen is introduced into the chamber to a 0.1 torr atmosphere. The electrodes are connected to a conventional RF power supply to strike a plasma in the low pressure oxygen atmosphere between the electrodes. In this embodiment, a 13.6 megahertz electrical signal is adjusted to strike a plasma discharge having a rms power of about 75 watts. A person skilled in the art would readily recognize that the low energy plasma discharge employed herein for treating the tungsten oxide film surface is substantially similar to the plasma discharge conventionally employed in other applications to strip a photoresist mask. The tungsten oxide film is exposed to the plasma for approximately five to ten minutes. The overall film temperature during exposure to the plasma discharge should preferably not increase more than 50° C. and should not approach the tungsten oxide crystallization temperatures 345° C.

Treatment of the film by exposure to a low energy plasma discharge affects only a surface layer having a thickness between about 0.05 and 0.15 microns.

After the tungsten oxide film is treated by exposing it to a plasma discharge in a low pressure oxygen atmosphere, plate 12 having overlayers 14, 21 and 16 is incorporated into an electrochromic display device in the aforementioned fashion to provide a device having a substantially extended useful lifetime.

Visual examination of the plasma-treated film and the as-deposited film reveals no apparent differences. Both the treated film and the vapor-deposited film are amorphous and transparent. However, experiments demonstrated that several properties of the plasma-treated film are surprisingly different from those of the as-deposited film. For example, when exposed to water, the as-deposited film dissolved after a few hours, but the plasma-treated film dissolved at a substantially slower rate, requiring as long as one week to completely dissolve. When exposed to a 10% by volume $H_2SO_4$ solution, the as-deposited film dissolved within about two days. In marked contrast, there was no apparent dissolution of the plasma-treated film in the acid solution even after several weeks of contact.

The plasma-treated tungsten oxide film was also subjected to a well-known experiment wherein the film surface is covered with a sulfuric acid solution and an indium wire is touched to the film surface through the acid solution, that is, the In wire contacts both the solution and the film. The In reacts with the acid to produce $In^{+3}$ ions that dissolve into the solution and electrons. When an untreated vapor-deposited film is tested, the film colors tungsten bronze as a result of the afore-mentioned electrochromic reactions between the tungsten oxide, electrons produced by the In-acid reactions and protons from the solution. However, the experiment does not color the plasma-treated tungsten oxide film.

A film was prepared having one surface portion plasma-treated and an immediately adjacent surface portion not treated. The treated and untreated surface portions were covered with a coextensive sulphuric acid solution. When the indium wire was touched through the acid solution to the untreated surface portion, the tungsten oxide underneath the treated surface colored tungsten bronze, as did the untreated film. This demonstrates that the tungsten oxide layer underlying the treated surface retains its electrochromic properties and that the treated surface conducts protons to the underlying layer to effect coloring. In contrast, when the wire was touched to the treated surface, no coloration occurred even in the untreated surface. Thus, it was concluded that the treated surface does not conduct electrons which are required to effect coloring.

Although the experiments clearly demonstrate a difference in chemical properties between the plasma-treated and the as-deposited tungsten oxide material, the effect of the treatment on the chemical structure of the film is uncertain. It is theorized that excited plasma particles, primarily electrons and oxygen ions, bombard the surface and cause a rearrangement of the molecular bonds therein, converting true amorphous tungsten oxide into random network amorphous tungsten oxide. Molecular restructuring is accomplished without a change in the empirical film composition, that is, no reactions are believed to occur between the tungsten oxide and the bombarding particles, particularly the excited oxygen particles. Since plasma oxygen does not react with the film in the preferred embodiment, it is apparent that surface treatment may be suitably effected by plasmas struck in atmospheres containing other gases that do not react with the tungsten oxide, such as nitrogen or the noble gases. Also, other energy sources may be suitably substituted for the preferred treating plasma, provided that they supply bond restructuring energy to randomly located sites at the film surface. For example, a laser or electron beam may be suitably adapted to produce the acid-resistant surface of this invention. An electron beam may be particularly well-suited to the practice of this invention in view of the large portion of bombarding electrons in the preferred treating plasma.

The extent of molecular rearrangement depends upon the time of exposure and the energy of the bombarding particles. In a high energy plasma discharge, the bombarding particles transfer more bond restructuring energy and penetrate deeper into the film to produce a thicker surface layer. Also, if the rate of energy transfer is too great, crystallization may occur, particularly if the tungsten oxide crystallization temperature is exceeded. A crystalline surface does not conduct protons as well as an amorphous or semi-amorphous surface and, therefore, is not preferred. In particular application, it is within the skill of the art to adjust the bombarding particle energy and the time of exposure to produce a film having an acid-resistant surface layer of a desired thickness.

While in the preferred embodiment, the treated tungsten oxide film having an acid-resistant surface was incorporated into a preferred electrochromic display device, it is apparent that the subject film may be advantageously incorporated into electrochromic display devices of different design. Electrochromic tungsten oxide films applied by means other than vapor deposition may be also rendered insoluble in an acidic solution by treatment in accordance with this invention.

While this invention has been described in terms of certain specific embodiments thereof, it will be appreciated that other forms can readily be adapted by those skilled in the art and, accordingly, the scope of this invention is to be considered limited only by the following claims.

The embodiments of the invention in which an exclusive property or privilege is claimed are defined as follows:

1. In an electrochromic device comprising a tungsten oxide film having a surface and an acidic electrolyte in contact with said film surface, said film being selectively colorable in response to an electric field applied across said film, the improvement wherein the tungsten oxide film comprises an acid-resistant oxygen-plasma-treated surface contacting the electrolyte and an electrochromic substrate, the surface tungsten oxide having an amorphous appearance and being substantially less soluble in the electrolyte than the substrate tungsten oxide.

2. In an electrochromic device comprising an electrode, an amorphous tungsten oxide film applied to said electrode, an acidic electrolyte in contact with said film and a suitable counterelectrode in contact with said electrolyte, the tungsten oxide film being selectively colorable or bleachable in response to an electric field applied between the electrode and the counterelectrode, the improvement wherein the tungsten oxide film comprises an underlying layer adjacent the electrode and consisting of amorphous, electrochromic tungsten oxide, and a surface layer lying between said electrolyte and said underlying layer and consisting of acid-resistant, nonelectrochromic, amorphous tungsten oxide that is capable of readily conducting protons, said surface layer cooperating with said underlying layer within the device to minimize the dissolution of the film into the electrolyte, but to conduct protons between said electrolyte and said underlying layer in response to the applied electric field and thereby to permit the desired coloring or bleaching of the underlying layer.

3. In an electrochromic display device comprising a transparent support, a transparent display electrode applied to said support, an amorphous tungsten oxide film vapor-deposited on said display electrode, an acidic aqueous electrolyte in contact with said film and a suitable counter-electrode in contact with said electrolyte, the tungsten oxide film being selectively colorable or bleachable in response to an electric field applied between the display electrode and the counterelectrode, the improvement wherein the tungsten oxide film comprises a substrate layer adjacent the display electrode consisting of amorphous, electrochromic tungsten oxide that is appreciably soluble in the acidic aqueous electrolyte, and an oxygen-plasma-treated surface layer overlying said substrate layer and exposed to said electrolyte, said surface layer consisting of amorphous, non-electrochromic tungsten oxide that is resistant to dissolution in the acidic aqueous electrolyte, but capable of readily conducting protons.

4. In an electrochromic display device comprising a transparent glass support, a transparent display electrode applied to said support, an amorphous tungsten oxide film vapor-deposited on said display electrode, an acidic aqueous electrolyte in contact with said film and a suitable counterelectrode in contact with said electrolyte, the tungsten oxide film being selectively colorable or bleachable in response to an electric field applied between the display electrode and the counterelectrode, the improvement wherein the tungsten oxide film comprises an underlying layer adjacent the display electrode consisting of electrochromic, amorphous tungsten oxide that comprises a plurality of trimeric $W_3O_9$ molecules and the hydrated products thereof bonded by weak intermolecular forces, and a low-energy-oxygen-plasma-treated surface layer lying between said electrolyte and said first underlying layer and preventing said electrolyte from directly contacting said underlying layer, said surface layer consisting of random network amorphous, nonelectrochromic tungsten oxide, said surface layer being difficultly soluble in the acid aqueous electrolyte and minimizing dissolution of the film into the electrolyte, but capable of readily conducting protons between said electrolyte and said underlying layer in response to the applied electric field to permit the desired coloring or bleaching of the underlying layer.

5. In the method of manufacturing an electrochromic tungsten oxide film for use in an electrochromic device wherein a surface of the film is exposed to an acidic electrolyte and the film is selectively colorable in response to an applied electric field by a reaction with protons supplied from the electrolyte, said method comprising forming an amorphous electrochromic tungsten oxide film having a surface intended to be exposed to said electrolyte the improvement comprising treating said film surface by bombardment with energy-transferring particles to form an acid-resistant, proton-conductive, nonelectrochromic tungsten oxide surface layer.

6. In the method of manufacturing an electrochromic amorphous tungsten oxide film for use in an electrochromic display device wherein a surface of the film is in contact with an acidic aqueous electrolyte, and said film is selectively colorable in response to an applied electric field, said method comprising vapor-depositing an amorphous, electrochromic tungsten oxide film upon a suitable electrode substrate, the deposited film having a surface intended to contact the electrolyte, the improvement comprising treating the vapor-deposited film by exposing said film surface to a low energy plasma discharge for a sufficient time to form a nonelectrochromic, proton-conductive acid-resistant amorphous tungsten oxide surface layer, said surface layer overlying an electrochromic tungsten oxide layer adjacent the electrode substrate.

7. In the method of manufacturing an electrochromic tungsten oxide film for use in an electrochromic display device wherein a surface of the film is in contact with an acidic aqueous electrolyte and the film selectively reacts with electrolyte protons in the presence of an applied electric field to change colors and thereby form the desired display, said method comprising vapor-depositing an amorphous, electrochromic tungsten oxide film upon an electrode substrate, the deposited film having a surface intended to contact said electrolyte, the improvement comprising exposing said film surface to a low energy plasma discharge in an oxygen atmosphere for a sufficient time to form a surface layer of nonelectrochromic, acid-resistant, proton-conductive, amorphous tungsten oxide, said layer overlying an as-deposited electrochromic tungsten oxide layer adjacent the electrode substrate, whereby when said film is incorporated into the display device, said surface layer is contacted with the electrolyte and minimizes dissolution of the film into said electrolyte, but conducts protons between said electrolyte and said electrochromic film layer to permit the selective coloring thereof.

* * * * *

UNITED STATES PATENT AND TRADEMARK OFFICE
CERTIFICATE OF CORRECTION

PATENT NO. : 4,306,773
DATED : December 22, 1981
INVENTOR(S) : Thomas C. Arnoldussen It is certified that error appears in the above—identified patent and that said Letters Patent is hereby corrected as shown below:

Column 3, line 68, "$WO_3O_9$" should read -- $W_3O_9$ --.

Column 4, line 6, "tunstate" should read -- tungstate --.

Column 4, line 68, "tunsten" should read -- tungsten --.

Column 5, line 29, "film 6" should read -- film 16 --.

Signed and Sealed this

Seventeenth Day of August 1982

[SEAL]

Attest:

GERALD J. MOSSINGHOFF

Attesting Officer      Commissioner of Patents and Trademarks